(12) United States Patent
Ishihara

(10) Patent No.: US 6,426,736 B1
(45) Date of Patent: Jul. 30, 2002

(54) PORTABLE TELEPHONE WITH LIQUID CRYSTAL DISPLAY

(75) Inventor: Junji Ishihara, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/471,271

(22) Filed: Dec. 23, 1999

(30) Foreign Application Priority Data

Dec. 28, 1998 (JP) .............................................. 10-374469

(51) Int. Cl.⁷ .................................................. G09G 3/36
(52) U.S. Cl. ........................ 345/102; 345/169; 455/566
(58) Field of Search ................................ 345/102, 169, 345/156, 168, 172, 173, 170; 455/566, 575; 341/22, 23, 34

(56) References Cited

U.S. PATENT DOCUMENTS 4,982,424 A * 1/1991 Saito et al. .................. 455/566
6,243,153 B1 * 6/2001 Adachi

FOREIGN PATENT DOCUMENTS

| GB | 2316837 | 3/1998 |
|----|---------|--------|
| JP | 02-104055 | 4/1990 |
| JP | 04-117735 | 4/1992 |
| JP | 04-241549 | 8/1992 |
| JP | 07-74691 | 3/1995 |
| JP | 08-125730 | 5/1996 |
| JP | 09-27844 | 1/1997 |
| JP | 09-134243 | 5/1997 |
| JP | 09-233016 | 9/1997 |
| JP | 09-321853 | 12/1997 |
| JP | 10-94060 | 4/1998 |
| JP | 10-190786 | 7/1998 |
| JP | 10-200615 | 7/1998 |

* cited by examiner

Primary Examiner—Regina Liang
(74) Attorney, Agent, or Firm—Sughrue Mion, PLLC

(57) ABSTRACT

A portable telephone having a liquid crystal display with a backlight includes a touch sensor arranged on a side surface of a main body, and an operation unit arranged on a front surface of the main body which has the liquid crystal display to input a telephone number or the like. The portable telephone has two modes, i.e., a touch mode for the touch sensor in lighting the backlight and a key operation mode by the operation unit in lighting the backlight. The backlight is lit in accordance with one of the two modes which is previously selected by a user.

18 Claims, 3 Drawing Sheets

PORTABLE TELEPHONE WITH LIQUID CRYSTAL DISPLAY

BACKGROUND OF THE INVENTION

1. Field of the Invention

The present invention relates to a portable telephone with a liquid crystal display and, more particularly, to a portable telephone capable of reducing power consumed by the lighting of a backlight or illumination light,

2. Description of the Prior Art

In a conventional portable telephone, the backlight or illumination light (to be referred to simply as a backlight hereinafter) is lit up for a predetermined period of time only when the user presses any key. When the user wants to use the portable telephone in a dark place at night, the display portion of the portable telephone cannot be seen due to the ambient darkness. To use it, the user must press any key, resulting in inconvenience.

To solve this problem, a portable telephone with a fold down mechanism has been proposed, as described in Japanese Unexamined Patent Publication No. 7-74691. According to the characteristic feature of this telephone, it has an LED for illuminating dial keys and serving as the backlight of an LCD (Liquid Crystal Display), a photosensor for detecting the ambient brightness, and a use state detection means for detecting a use state upon detecting that a dial key was pressed within a predetermined period of time. The LED is turned on in accordance with the detection of the use state and ambient darkness. The battery power can be saved without using a mechanical switch or sensor, or sacrificing durability in detecting the open/closed state of the fold down mechanism.

Another conventional portable telephone is described in Japanese Unexamined Patent Publication No. 9-27844 as a portable telephone with a display function. The lighting time of a backlight for illuminating a liquid crystal display is minimized to save the power consumption, thereby maximizing the telephone use time without overcharging. The lighting time of the backlight is controlled in a dark place as follows. According to the characteristic feature of this telephone, for example, in a dark place, the backlight is turned on in response to the input of a speech communication start key or termination at the start of speech communication. A timer is then started, and the backlight is turned off until a speech input is detected or with a lapse of a predetermined period of time.

In the prior arts described above, a C-MOS one-chip system IC or liquid crystal display is used or employed to reduce the power consumption of the batteries of the portable telephones to allow long-time use of the batteries. In particular, a variety of techniques have been developed to reduce the power consumption of the backlight for the liquid crystal display. The reduction in power consumption must be considered together with convenience in use of a portable telephone in many respects.

SUMMARY OF THE INVENTION

The present invention has been made in consideration of the above situation, and has as its object to provide a portable telephone which can be immediately operated even in a dark place to improve operability and can reduce power consumption of a battery to allow longer-time use.

In order to achieve the above object according to the first main aspect of the present invention, there is provided a portable telephone having a liquid crystal display with a backlight, comprising a touch sensor arranged on a side surface of a main body and an operation unit for inputting a telephone number or the like, wherein the telephone has two preset modes, a touch mode for the touch sensor and a key operation mode for the operation unit, and the backlight is lit when a user sets one of the two modes.

According to the second main aspect of the present invention, there is provided a portable telephone having a liquid crystal display with a backlight, comprising a touch sensor arranged on a side surface of a main body, a photosensor for detecting an ambient lightness, an operation detector for detecting an operation of an operation unit for inputting a telephone number or the like, and a sound sensor for detecting a speech input, wherein the telephone has two modes, a first mode of lighting the backlight upon detecting signals from the touch sensor, photosensor, and sound sensor, and a second mode of lighting the backlight upon detecting signals from the operation detector, photosensor, and sound sensor.

In the portable telephone of the first or second main aspect, lighting the backlight by the touch sensor is controlled.

According to the present invention, the operation of the portable telephone according to the first and second main aspects requires the first step of determining whether a sensor signal from a touch sensor is detected, the second step of determining upon detecting the sensor signal whether a backlight lighting flag is ON, the third step of, when the sensor signal is not detected, returning to the first step of determining whether the sensor signal from the touch sensor is detected, the fourth step of lighting the backlight when the backlight lighting flag is ON, the fifth step of, when the backlight lighting flag is OFF, returning to the first step of determining whether the sensor signal from the touch sensor is detected, and the sixth step of returning to the first step of determining whether the sensor signal from the touch sensor is detected after the fourth step of lighting the backlight.

As can be apparent from the above aspects and related explanation, in the portable telephone of the present invention, when the user sets the backlight lighting flag ON in advance so as to light the backlight upon touching the touch sensor by a key operation or the like, the backlight can be lit to see the display portion by simply holding the portable telephone with a hand without performing any key operation even if the display portion of the portable telephone cannot be seen in a dark place.

When the backlight lighting flag is OFF, the backlight is lit with any key-in operation on the operation unit 14. In this case, the lighting time can be shortened as compared with the lighting of the backlight upon touching the touch sensor.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENTS

Several preferred embodiments of the present invention will be described in detail with reference to the accompanying drawings.

Figure 1:
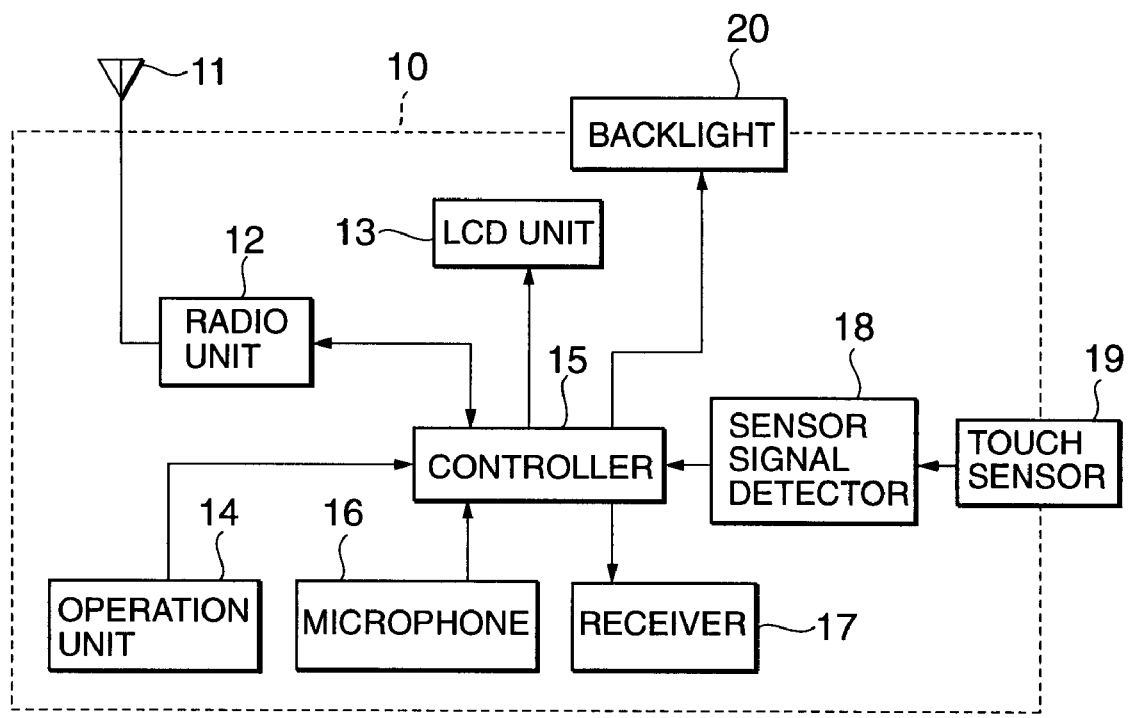
FIG. 1 is a block diagram showing the internal arrangement of a portable telephone according to the first embodiment of the present invention.
Figures 2A, 2B:
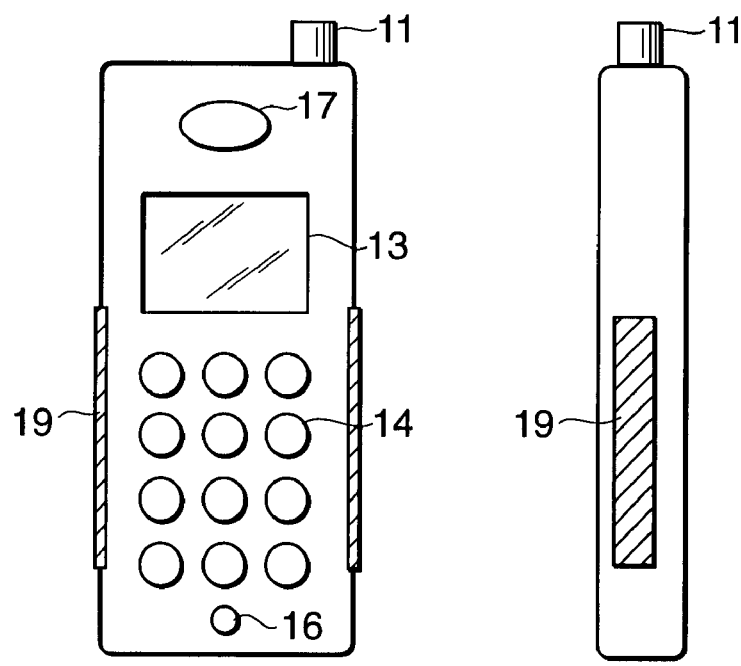
FIGS. 2A and 2B are a front view and side view, respectively, showing the outer appearance of the portable telephone according to the first embodiment of the present invention.

FIG. 1 is a block diagram showing the internal arrangement of a portable telephone 10 according to the first embodiment of the present invention. FIGS. 2A and 2B are a front view and side view, respectively, showing the portable telephone of the first embodiment. The portable telephone of the first embodiment shown in FIGS. 1, 2A, and 2B comprises an antenna 11, radio unit 12, LCD (Liquid Crystal Display) unit 13, operation unit 14, controller 15, microphone 16, receiver 17, sensor signal detector 18, touch sensor 19, and backlight 20. The antenna 11 communicates with a base station (not shown). The radio unit 12 receives radio waves of a control channel via the antenna 11 to perform input/output operation for information communicated between the base station and controller 15. The LCD unit 13 visually displays various kinds of information. The operation unit 14 outputs key input data to the controller 15. The controller 15 controls the radio unit 12, LCD unit 13, operation unit 14, microphone 16, receiver 17, and backlight 20. The user inputs speech in speech communication or the like with the microphone 16. The receiver 17 outputs partner speech in speech communication. The sensor signal detector 18 detects a sensor signal from the touch sensor 19. The backlight 20 is controlled by the controller 15.

The backlight 20 is generally comprised of a thin fluorescent lamp, LED (Light Emitting Diode) or inorganic or organic EL (Electro-Luminescence) unit. The backlight 20 illuminates the back surface of the LCD unit 13 through a diffusion plate. The LCD unit 13 is irradiated with light from the side of the diffusion plate or illuminated with light from the back by another method. The user can clearly recognize the display characters and display marks on the liquid crystal display.

The antenna 11 is generally comprised of a rod antenna which is retracted inside the portable telephone or extended outside during speech communication. The radio unit has transmission and reception sections. The radio unit encodes a speech signal from the microphone 18, makes the transmission section convert the encoded baseband signal into an RF signal, and sends the RF signal to the base station via the antenna 11. The antenna 11 receives a reception wave from the base station, and the reception section in the radio unit converts the RF signal into the baseband signal. The baseband signal is supplied to the receiver 17 via the controller 15, thereby outputting a speech signal. In general, a call signal is exchanged to assure a speech communication channel by a predetermined protocol in accordance with the relationship with the base station prior to speech communication.

The touch sensor 19 is comprised of a pressure-sensitive element or resistance film element disposed at a portion where the user can touch when the user operates the portable telephones with his one or two hands. The sensor signal detector 16 detects a change in voltage when the user touches the pressure-sensitive element. The sensor signal detector 16 detects a change in resistance when the user touches the resistance film.

The portable telephone in FIG. 1 has no lightness detector for detecting the ambient lightness. However, the portable telephone may have a photosensor. When a reflection liquid crystal panel requiring no backlight for the liquid crystal display is used, an illumination light may be arranged at an appropriate position to illuminate the front surface of the liquid crystal display in place of the backlight, thereby improving readability of the liquid crystal display.

The operation of the first embodiment of the present invention will be described with reference to FIGS. 1, 2A, 2B, and 3.

When the user presses the power button switch on the operation unit 14 to power the portable telephone on, the controller 15 makes the sensor signal detector 18 start operation. When the user touches the touch sensor 19, the sensor signal detector 18 detects a sensor signal. When the sensor signal from the touch sensor 19 is detected (step 31), it is determined whether the backlight lighting flag is ON (step 32).

The backlight lighting flag is set by the user in advance. A selection window is displayed on the LCD unit 13 to allow the user to previously select a "backlight lighting mode by sensor" (touch mode) or "backlight lighting mode by key input" (key operation mode) in accordance with an input from the operation unit 14. When the "backlight lighting mode by sensor" is selected, the backlight lighting flag is set ON. When the "backlight lighting mode by key input" is selected, the backlight lighting flag is set OFF.

When the backlight lighting flag is ON in step 32, the controller 15 turns on the backlight 20 (step 33), and the flow returns to the process (step 31) for determining whether the sensor signal from the touch sensor 19 is detected. When the "backlight lighting by key input" is selected, the backlight is not lit at the time of detection of the sensor signal, but the backlight is lit for a predetermined period of time in accordance with an input from the operation unit 14. If the backlight lighting flag is OFF in step 32, the flow returns to the process (step 31) for determining whether the sensor signal from the touch sensor 19 is detected to wait for detection of a sensor signal.

As described above, when the backlight lighting flag is ON, the backlight is lit after the user touches the touch sensor 19. When the backlight lighting flag is OFF, the backlight is lit by any key-in operation on the operation unit 14. The latter operation can have a shorter backlight lighting time than that in the former operation.

When no key operation is detected for a predetermined period of time, including a key operation on the operation unit 14, the backlight can be turned off upon a time-out. When illumination is present in the outer environment, backlight illumination may be stopped. When no speech input is present, the backlight may be turned off. In this manner, a variety of countermeasures can be so made to prolong the service life of the battery of the portable telephone in backlight illumination.

The modification of the first embodiment of the present invention will be described in more detail with reference to the accompanying drawing.

The first embodiment employs the following backlight lighting flag setting means. The selection window is displayed on the LCD unit 13 to allow the user to select the "backlight lighting by sensor" or "backlight light by key input", and the user selects the desired mode. The backlight lighting flag is set not by a key operation (input from the operation unit 14) but by a speech input as the modification of the first embodiment.

Figure 3:
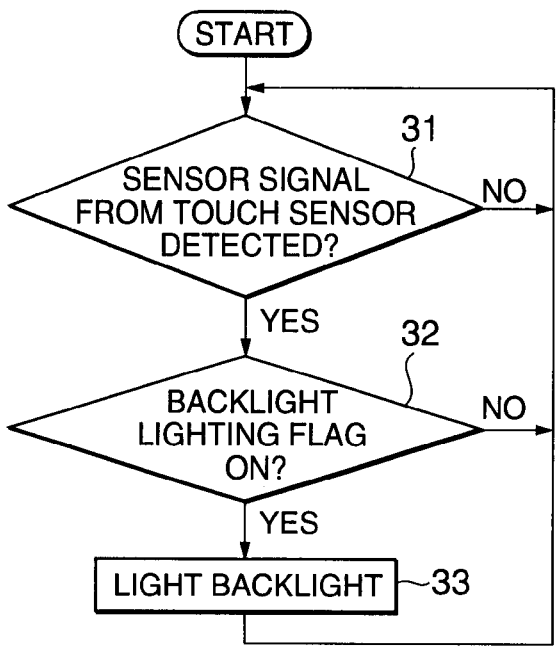
FIG. 3 is a flow chart showing an operation sequence of the portable telephone of the present invention.

Referring to FIG. 3, when the user presses the power button switch on the operation unit 14 to power the portable telephone on, the controller 15 makes the sensor signal detector 18 start operation. When the user touches the touch sensor 19, the sensor signal detector 18 detects a sensor signal. When the sensor signal from the touch sensor 19 is detected (step 31), it is determined whether the backlight lighting flag is ON.

The backlight lighting flag is set by the user in advance. Speech, i.e., a registered fixed word "backlight ON" is input from the microphone 16 at the time of setting. The controller 15 analyzes speech data to set the backlight lighting flag ON. When speech "backlight OFF" is input from the microphone 16, the controller 15 sets the backlight lighting flag OFF.

When the backlight lighting flag is ON (step 32), the controller 15 lights the backlight 20 (step 33), and the flow returns to the process (step 31) for determining whether the sensor signal from the touch sensor 19 is detected. If the backlight lighting flag is OFF (step 32), the flow returns to the process (step 31) for determining whether the sensor signal from the touch sensor 19 is detected, and flow waits until a sensor signal is detected.

In this case as well, when the backlight lighting flag is ON, the backlight is lit upon touching the touch sensor 19. When the backlight lighting flag is OFF, the backlight is lit in response to any key-in operation on the operation unit 14. The latter operation can have a shorter backlight lighting time than that of the former operation. In the former operation, the first key-in operation is required in a dark place.

The second embodiment of the present invention will be described with reference to FIG. 4.

Figure 4:
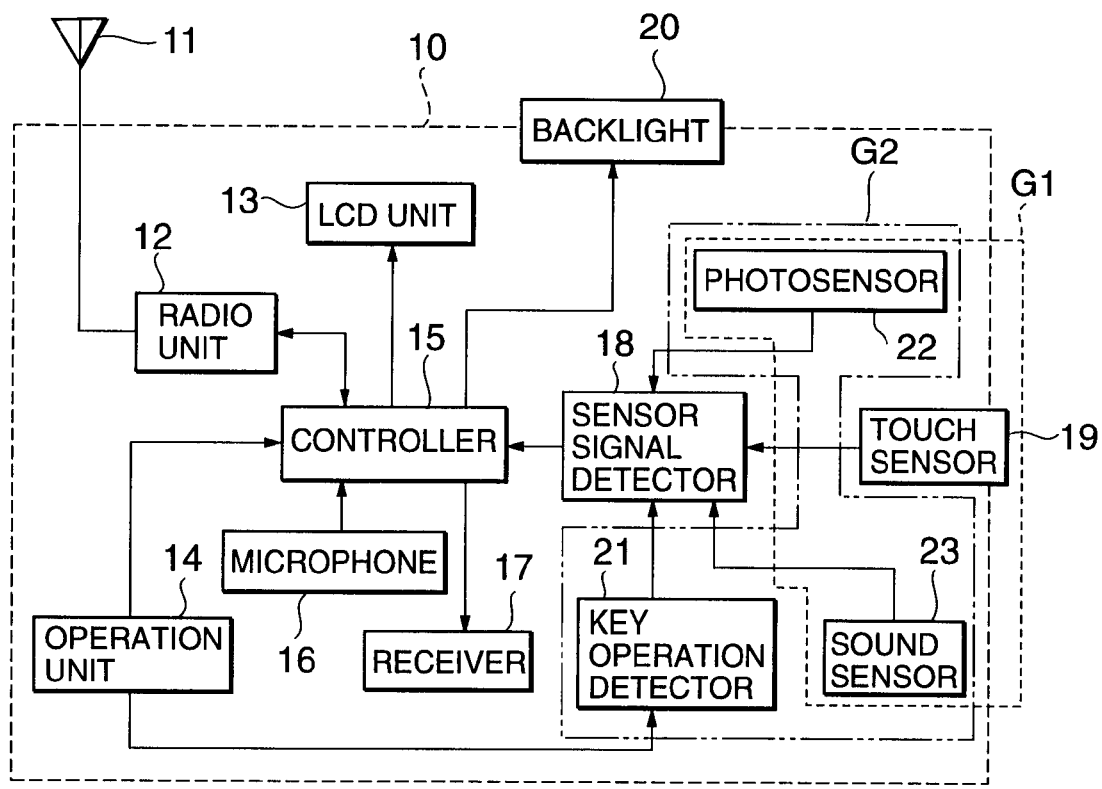
FIG. 4 is a block diagram showing the internal arrangement of a portable telephone according to the second embodiment of the present invention.

As can be apparent from FIG. 4, the second embodiment has four detectors, i.e., a touch sensor 19 arranged on a side surface of a main body, a photosensor 22 for detecting an external lightness, an operation detector 21 for detecting a key operation on the operation unit for inputting a telephone number and the like, and a sound sensor 23 for detecting a speech input. The second embodiment has the first mode for lighting the backlight in accordance with detection signals from the touch sensor 19, photosensor 22, and sound sensor 23, all of which construct a first group G1 in FIG. 4, and the second mode for lighting the backlight in accordance with the detection signals from the operation unit 21, photosensor 22, and sound sensor 23, all of which construct a second group G2 in FIG. 4. These two modes can be selectively set in advance on the selection window on the liquid crystal display in accordance with an operation on an operation unit 14. The backlight is lit in accordance with the selected mode.

The lighting operation for the backlight according to the second embodiment is performed in the same manner as in the operation of FIG. 3, and a description thereof will be omitted.

Three or more modes can be set by the above detection signals in accordance with the situation of the portable telephone, thereby further reducing the power consumption of the battery. For example, when the external lightness is high and the detection signal level from the photosensor is high, the backlight can be kept off.

In the portable telephone with a reflection liquid crystal display, the illumination light can also be kept off, thereby further reducing the power consumption of the battery.

Figure 5:
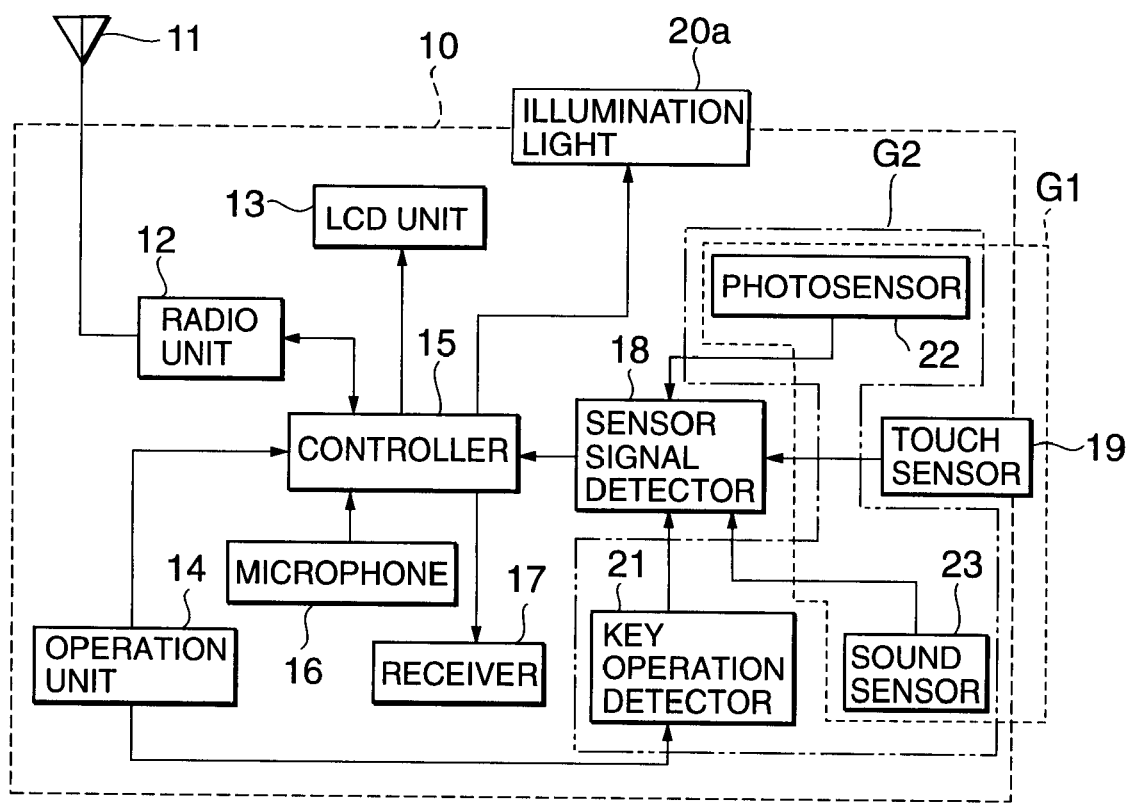
FIG. 5 is a block diagram showing the internal arrangement of a portable telephone according to the third embodiment of the present invention.

FIG. 5 shows the internal arrangement of a portable telephone having a reflection liquid crystal display illuminated with an illumination light 20a according to the third embodiment of the present invention.

As can be apparent from comparison between the arrangements of FIGS. 4 and 5, they are substantially the same except that the arrangement of FIG. 4 has the backlight 20 while the arrangement of FIG. 5 has the illumination light 20a. The operation of the third embodiment is substantially the same as that in the flow chart of FIG. 3, and a description thereof will be omitted.

The present invention is not limited to the particular embodiments described above, and various changes and modifications can be made without departing from the spirit and scope of the present invention.

What is claimed is:

1. A portable telephone having a liquid crystal display with a backlight, comprising a touch sensor arranged on a side surface of a main body, and an operation unit arranged on a front surface of the main body which has said liquid crystal display to input a telephone number, wherein said portable telephone has two modes, a touch mode for said touch sensor in lighting said backlight and a key operation mode by said operation unit in lighting said backlight, and said backlight is lit in accordance with one of the two modes which is selected by a user.

2. A telephone according to claim 1, wherein the touch mode by said touch sensor is a mode for activating a sensor detector for detecting a sensor signal from said touch sensor to detect contact to said touch sensor, the key operation mode by said operation unit is a mode for detecting a key input (key-in) on said operation unit, and said telephone further comprises means for setting a backlight lighting flag ON or OFF in setting each of the two modes.

3. A telephone according to claim 1, wherein each of the two modes is previously set in accordance with a key input on said operation unit.

4. A telephone according to claim 2, wherein each of the two modes is set by a speech input.

5. A telephone according to claim 1, wherein when no key input is entered on said operation unit a predetermined period of time after said backlight is lit in the touch mode, said backlight is turned off.

6. A portable telephone having a liquid crystal display with a backlight, comprising a touch sensor arranged on a side surface of a main body, a photosensor for detecting an ambient lightness, an operation detector for detecting an operation of an operation unit for inputting a telephone number, and a sound sensor for detecting a speech input, wherein said telephone has two modes, a first mode of lighting said backlight upon detecting signals from said touch sensor, photosensor, and sound sensor, and a second mode of lighting said backlight upon detecting signals from said operation detector, photosensor, and sound sensor, and said backlight is lit in accordance with one of the two modes which is selected by a user.

7. A telephone according to claim 6, further comprising means for setting a backlight lighting flag ON or OFF in setting the two modes.

8. A telephone according to claim 7, wherein each of the two modes is previously set in accordance with a key input on said operation unit.

9. A telephone according to claim 7, wherein each of the two modes is set by a speech input.

10. A portable telephone having an illumination light with a reflection liquid crystal display, comprising a touch sensor arranged on a side surface of a main body, a photosensor for detecting an ambient lightness, an operation detector for detecting an operation of an operation unit for inputting a telephone number, and a sound sensor for detecting a speech input, wherein said telephone has two modes, a first mode of lighting said illumination light upon detecting signals from said touch sensor, photosensor, and sound sensor, and a second mode of lighting said illumination light upon detecting signals from said operation detector, photosensor, and sound sensor, and said illumination light is lit in accordance with one of the two modes which is selected by a user.

11. A telephone according to claim 10, further comprising means for setting an illumination light lighting flag ON or OFF in setting the two modes.

12. A telephone according to claim 11, wherein each of the two modes is previously set in accordance with a key input on said operation unit.

13. A telephone according to claim 11, wherein each of the two modes is set by a speech input.

14. A portable telephone comprising:
   a display coupled to said portable telephone;
   an operation unit coupled to said telephone, said operation unit adapted to input a telephone number;
   a light connected to illuminate at least one of said display and said operation unit; and
   a touch sensor arranged on a side surface of said telephone,
   wherein said light is controlled according to one of two modes designated by a user independently from other function settings of said telephone, said two modes comprising a touch mode in which said light is lit in response to a signal from at least one of said touch sensor and a sound sensor coupled to said telephone, said sound sensor connected to detect speech input from a user, and an operation mode in which said light is lit in response to a signal from at least one of said operation unit and said sound sensor.

15. A portable telephone according to claim 14, wherein said light is comprised of at least one of a backlight and an illumination light, said illumination light being used in conjunction with a reflection liquid crystal display.

16. A portable telephone according to claim 14, wherein said light is further controlled by at least one of a sound sensor and a photosensor.

17. A method of controlling a light on a portable telephone, said method comprising:
   receiving user input designating one of two modes for controlling a light connected to illuminate at least one of a display coupled to said telephone and an operation unit coupled to said telephone, said operation unit adapted to input a telephone number,
   said two modes comprised of a touch mode in which said light is lit in response to a signal from at least one of a touch sensor arranged on a side surface of said telephone and a sound sensor coupled to said telephone, said sound sensor connected to detect speech input from a user, and an operation mode in which said light is lit in response to a signal from at least one of said operation unit and said sound sensor.

18. A portable telephone comprising:
   display means for displaying information coupled to said portable telephone;
   operation means for inputting a telephone number, said operation means being coupled to said telephone;
   lighting means for illuminating at least one of said display means and said operation means; and
   touch sensor means for sensing a user's touch, said touch sensor being arranged on a side surface of said telephone,
   wherein said lighting means are controlled according to one of two modes set by a user, a touch mode in which said lighting means is lit in response to a signal from at least one of said touch sensor means and a sound sensor means coupled to said telephone, said sound sensor means connected to detect speech input from a user, and an operation mode in which said lighting means is lit in response to a signal from at least one of said operation means and said sound sensor means.

* * * * *